United States Patent
Chen et al.

(10) Patent No.: US 10,607,483 B2
(45) Date of Patent: Mar. 31, 2020

(54) VEHICLE IDENTIFICATION METHODS AND SYSTEMS

(71) Applicants: Nuctech Company Limited, Beijing (CN); Tsinghua University, Beijing (CN)

(72) Inventors: Zhiqiang Chen, Beijing (CN); Li Zhang, Beijing (CN); Jianmin Li, Beijing (CN); Ziran Zhao, Beijing (CN); Yaohong Liu, Beijing (CN); Qiang Li, Beijing (CN); Zheng Hu, Beijing (CN); Jianping Gu, Beijing (CN); Ying Li, Beijing (CN)

(73) Assignees: Tsinghua University, Beijing (CN); Nutech Company Limited, Beijing (CN)

( * ) Notice: Subject to any disclaimer, the term of this patent is extended or adjusted under 35 U.S.C. 154(b) by 0 days.

(21) Appl. No.: 15/300,947

(22) PCT Filed: Dec. 23, 2015

(86) PCT No.: PCT/CN2015/098439
§ 371 (c)(1),
(2) Date: Sep. 30, 2016

(87) PCT Pub. No.: WO2016/107475
PCT Pub. Date: Jul. 7, 2016

(65) Prior Publication Data
US 2017/0294118 A1     Oct. 12, 2017

(30) Foreign Application Priority Data

Dec. 30, 2014 (CN) .......................... 2014 1 0841346

(51) Int. Cl.
*G08G 1/054* (2006.01)
*G08G 1/017* (2006.01)
(Continued)

(52) U.S. Cl.
CPC ........... *G08G 1/054* (2013.01); *G01V 5/0008* (2013.01); *G01V 5/0016* (2013.01);
(Continued)

(58) Field of Classification Search
None
See application file for complete search history.

(56) References Cited

U.S. PATENT DOCUMENTS 5,392,034 A     2/1995   Kuwagaki
5,839,085 A  *  11/1998  Yoshikawa ............ G08G 1/015
                                                             701/117
(Continued)

FOREIGN PATENT DOCUMENTS

CN     101162204 A  *  4/2008  ............. G06F 19/00
CN     102565872 A      7/2012
(Continued)

OTHER PUBLICATIONS

"International Application No. PCT/CN2015/098439, International Search Report dated Mar. 24, 2016", w/ English Translation, (Mar. 24, 2016), 6 pgs.
(Continued)

*Primary Examiner* — Chico A Foxx
(74) *Attorney, Agent, or Firm* — Schwegman Lundberg & Woessner, P.A.

(57) ABSTRACT

Disclosed is a vehicle identification method and system. The method includes: acquiring appearance information of an inspected vehicle; obtaining external features of the vehicle based on the appearance information; acquiring a transmission image of the vehicle and obtaining internal features of the vehicle from the transmission image; forming descriptions on the vehicle at least based on the external features and the internal features; and determining a vehicle model of the vehicle from a vehicle model databased by utilizing the
(Continued)

descriptions. This method merges various types of modality information, especially introducing the transmission image, and combines the internal structure information with the appearance information, so that the present disclosure can identify a vehicle model more practically.

13 Claims, 3 Drawing Sheets (51) Int. Cl.
G06K 9/46 (2006.01)
G01V 5/00 (2006.01)
G08G 1/015 (2006.01)

(52) U.S. Cl.
CPC ......... *G06K 9/4604* (2013.01); *G06K 9/4642* (2013.01); *G08G 1/017* (2013.01); *G08G 1/015* (2013.01)

(56) References Cited

U.S. PATENT DOCUMENTS

| | | | |
|---|---|---|---|
| 6,411,328 B1* | 6/2002 | Franke | G08G 1/04 340/937 |
| 7,596,275 B1 | 9/2009 | Richardson et al. | |
| 8,155,384 B2* | 4/2012 | Chew | G01V 5/0008 348/143 |
| 8,311,343 B2* | 11/2012 | Chung | G06K 9/00785 348/143 |
| 2004/0076265 A1* | 4/2004 | Heuscher | A61B 6/032 378/210 |
| 2005/0267657 A1* | 12/2005 | Devdhar | G06K 9/00208 701/33.4 |
| 2006/0114531 A1* | 6/2006 | Webb | G01N 21/8806 359/15 |
| 2007/0009136 A1* | 1/2007 | Pawlenko | G06K 9/3241 382/104 |
| 2007/0285809 A1* | 12/2007 | Takahashi | G08G 1/017 359/851 |
| 2008/0136625 A1 | 6/2008 | Chew | |
| 2009/0174575 A1* | 7/2009 | Allen | G07B 15/063 340/933 |
| 2010/0052885 A1* | 3/2010 | Hanqvist | G01J 5/0022 340/436 |
| 2010/0100275 A1* | 4/2010 | Mian | G01M 17/013 701/31.4 |
| 2010/0104199 A1* | 4/2010 | Zhang | G06K 9/00798 382/199 |
| 2011/0194725 A1* | 8/2011 | Das Gupta | G06K 19/06037 382/100 |
| 2011/0242319 A1* | 10/2011 | Miyajima | G01C 21/3647 348/148 |
| 2012/0010851 A1* | 1/2012 | Mintz | G01G 19/021 702/173 |
| 2012/0243789 A1* | 9/2012 | Yang | G06K 9/4676 382/195 |
| 2012/0245873 A1* | 9/2012 | Donnangelo | G01N 22/00 702/65 |
| 2012/0263276 A1* | 10/2012 | Schubert | G01N 23/203 378/87 |
| 2013/0300585 A1* | 11/2013 | Zhu | G08G 1/017 340/941 |
| 2014/0037142 A1* | 2/2014 | Bhanu | G08G 1/015 382/103 |
| 2014/0176679 A1* | 6/2014 | Lehning | H04N 13/0275 348/46 |
| 2014/0267733 A1* | 9/2014 | Wu | G08G 1/054 348/149 |
| 2015/0104073 A1* | 4/2015 | Rodriguez-Serrano | G06F 16/5846 382/105 |
| 2015/0369955 A1* | 12/2015 | Al-Hoshani | G01V 5/0016 378/57 |
| 2016/0070986 A1* | 3/2016 | Chidlovskii | G06K 9/00785 382/104 |
| 2016/0148072 A1* | 5/2016 | Chan | G06K 9/00536 382/104 |
| 2016/0180186 A1* | 6/2016 | Sun | G06K 9/00201 382/104 |

FOREIGN PATENT DOCUMENTS

| | | |
|---|---|---|
| CN | 202853581 U | 4/2013 |
| CN | 103324920 A | 9/2013 |
| CN | 203981903 U | 12/2014 |

OTHER PUBLICATIONS

"International Application No. PCT/CN2015/098439, Written Opinion dated Mar. 24, 2016", (Mar. 24, 2016), 3 pgs.

"Chinese Application Serial No. 201410841346.4, Office Action dated Aug. 1, 2018", (Aug. 1, 2018), 21 pgs.

* cited by examiner

VEHICLE IDENTIFICATION METHODS AND SYSTEMS

PRIORITY APPLICATIONS

This application is a U.S. National Stage Filing under 35 U.S.C. 371 from International Application No. PCT/CN2015/098439, filed on 23 Dec. 2015, and published as WO2016/107475 on 2 Jul. 2016, which claims the benefit of priority to Chinese Application No. 201410841346.4, filed on 30 Dec. 2014; which applications and publication are incorporated herein by reference in their entirety.

TECHNICAL FIELD

The present disclosure relates to the vehicle model identification technology, and in particular, to methods and systems for identifying a vehicle model by utilizing the image processing and pattern identification technology in intelligent transportation, security inspection, and the like field.

BACKGROUND

Currently, intelligent transportation and security check have been popularizing, and related concepts have become well known. In these fields, vehicle model identification has played a crucial role. In fact, there is no clear definition on the vehicle mode identification. This is caused by its wide application and the huge differences in its implementation environments, means and purposes. In general, an identification aimed to obtain unique information of a vehicle, e.g., a vehicle plate number identification system, is defined as "vehicle identification." And, the "vehicle model identification" here refers to means and methods for identifying a specific model of a vehicle in a non-contact manner or passive observation. In the practical application, the vehicle model identification has different purposes, depending on different requirements. For example, traffic analysis in the intelligent transportation only needs to care about the number of vehicles and the approximate vehicle models. In an aspect such as market statistics, public security inspection, etc., vehicle brand is more important. In the security inspection field, it is more critical to identify an accurate factory model of a vehicle.

Although the vehicle model identification has been studied, it is impossible to accurately identify the factory model.

SUMMARY

In view of the one or more problems in the prior art, the present disclosure proposes vehicle inspection methods and systems.

According to an aspect of the present disclosure, a vehicle identification method is proposed. The method includes: acquiring appearance information of an inspected vehicle and obtaining external features of the vehicle based on the appearance information; acquiring a transmission image of the vehicle and obtaining internal features of the vehicle from the transmission image; forming descriptions on the vehicle at least based on the external features and the internal features; and determining a vehicle model of the vehicle from a vehicle model database by utilizing the descriptions.

Preferably, said obtaining internal features of the vehicle from the transmission image comprises: dividing the transmission image into a plurality of sub-image blocks; performing feature extraction on the plurality of sub-image blocks; and performing significance weighting on features of each sub-image block to form the internal features of the vehicle.

Preferably; the vehicle's head has significance larger than that of the vehicle's side.

Preferably, said appearance information includes contour information obtained by using an infrared sensor and face information and chassis information of the vehicle obtained using a visible light sensor, and the external features include contour features based on the contour information, face features based on the face information and chassis features based on the chassis information.

Preferably, the vehicle is identifies by using the contour features, the face features and the chassis features in sequence.

Preferably, a bag-of-word model based feature extraction is performed on the plurality of sub-image blocks, and local significance weighting is performed on the extracted bag-of-word model features to form perspective features by means of concatenation or direct summation.

Preferably, a gradient operation is applied on the chassis image to form a gradient image, and then local projection features of the gradient image are used as the chassis features.

Preferably, the gradient image is divided into a plurality of sub-image blocks, and a horizontal projection, a vertical projection and/or a slanting projection of the sub-image blocks are calculated, respectively, to form feature vectors as the chassis features.

According to another aspect of the present disclosure, a vehicle identification system is proposed. The system includes: a sensor configured to sense appearance information of an inspected vehicle; a ray scanning device configured to perform ray scanning on the inspected vehicle to acquire a transmission image of the vehicle; and an information processing device configured to obtain external features of the vehicle based on the appearance information, to obtain internal features of the vehicle from the transmission image, to form descriptions on the vehicle at least based on the external features and the internal features, and to determine a vehicle model of the vehicle from a vehicle model database by utilizing the descriptions Preferably, the information processing device divides the transmission image into a plurality of sub-image blocks, performs feature extraction on the plurality of sub-image blocks, and performs significance weighting on features of each sub-image block to form the internal features of the vehicle.

Preferably, the vehicle's head has significance larger than that of the vehicle's side.

Preferably, said appearance information includes contour information obtained by using an infrared sensor and face information and chassis information of the vehicle obtained using a visible light sensor, and the external features include contour features based on the contour information, face features based on the face information and chassis features based on the chassis information.

According to a further aspect of the present disclosure, a vehicle identification method is proposed. The method includes: acquiring appearance information of an inspected vehicle and obtaining external features of the vehicle based on the appearance information; acquiring a transmission image of the vehicle and obtaining internal features of the vehicle from the transmission image; forming descriptions on the vehicle at least based on the external features and the internal features; determining a vehicle model of the vehicle from a vehicle model database by utilizing the descriptions; determining a standard transmission image of the model from a database by utilizing the determined model; and determining whether there is an entrainment in the vehicle by comparing the transmission image of the inspected vehicle with the standard transmission image.

Preferably, the method further includes: determining a change region of the transmission image of the inspected vehicle relative to the standard transmission image; and presenting the change region to the user.

Preferably, said determining a change region of the transmission image of the inspected vehicle relative to the standard transmission image comprises: performing a registration on the transmission image of the inspected vehicle and the standard transmission image; and calculating a difference between the transmission image of the inspected vehicle and the standard transmission image.

Preferably, said presenting the change region to the user comprises: highlighting the change region on the transmission image.

With the above embodiments, the present disclosure can improve automation of the security inspection for a small vehicle while improving efficiency of the security inspection.

BRIEF DESCRIPTION OF THE DRAWINGS

To understand the present disclosure in a better way, a detailed description of the present disclosure will be given with reference to the following drawings, in which.

DETAILED DESCRIPTION

Specific embodiments of the present disclosure will be described in detail below. It should be noted that the embodiments herein are used for illustration only, without limiting the present disclosure. Hereinafter, to provide a thorough understanding of the present disclosure, numerous specific details are set forth. However, it would be obvious for one ordinarily skilled in the art that the present disclosure can be practiced without these specific details. In other examples, known structures, materials, or methods are not described in detail to avoid any possible obfuscation of the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" presented in various positions throughout the specification may not necessarily refer to the same embodiment or example. Furthermore, specific features, structures or properties may be combined into one or more embodiments or examples in any appropriate combination and/or sub-combination. Moreover, it should be understood for those skilled in the art that the term "and/or" used herein means any and all combinations of one or more listed items.

In view of the narrow application range of the vehicle model identification due to difficulty in the accurate vehicle model identification in the prior art, some embodiments of the present disclosure propose to perform vehicle model identification by combining a vehicle's appearance information with its internal structure information. For example, a vehicle model may be accurately identified by acquiring a vehicle's appearance information (for example including size and contour information obtained from an infrared curtain, and pictures of the vehicle's face and chassis acquired by a CCD camera) and internal structure information (for example acquired from a transmission image).

In some embodiments, the present disclosure focuses on the vehicle model identification application of small passenger cars in the security inspection field. Since a vehicle in such an application may load few goods, a transmission image may play a great role. In addition, if an object to be inspected is limited to a head of a truck, solutions according to embodiments of the present application may also perform accurate identification.

Figure 1:
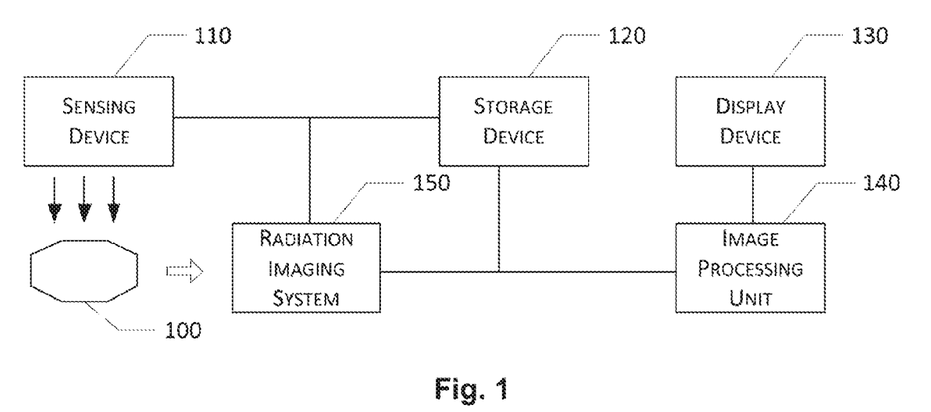
FIG. 1 is a schematic diagram illustrating a vehicle inspection system according to an embodiment of the present disclosure.

FIG. 1 is a schematic diagram illustrating a vehicle inspection system according to an embodiment of the present disclosure. As shown in FIG. 1, the vehicle inspection system according to the embodiment of the present disclosure relates to the security inspection technology by utilizing X-ray radiation imaging, especially the vehicle model identification technology in the automatic detection technology for entrainments in a small vehicle, as well as performing vehicle inspection by means of the vehicle model identification technology.

The system as illustrated in FIG. 1 includes a sensing device 110, a radiation imaging system 150, a storage device 120, a data processing unit 140, and a display device 130.

In some embodiments, the sensing device 110 includes one or more sensors such as a Charge-coupled Device (CCD) device, an infrared curtain, etc., for acquiring appearance information of a vehicle, such as a chassis image, vehicle size information, chassis information, etc. In other embodiments, the sensing device may include a camera for capturing an image of the inspected vehicle's plate number and an identifying unit for identifying the inspected vehicle's plate number from the image. In another embodiment, as an ID acquiring unit, the sensing device 110 may include a reader for reading the inspected vehicle's ID from a RF label carried by the vehicle.

The radiation imaging system 150 performs X-ray scanning on the inspected vehicle to obtain an X-ray image of the inspected vehicle. The storage device 120 stores the X-ray image and a vehicle model template database.

The data processing unit 140 retrieves a vehicle model template corresponding to the vehicle from the vehicle model template database and determines a change region of the ray transmission image relative to the template image. The display device 130 presents the change region to the user.

For example, when there is a small vehicle to be inspected, the sensing device 110 obtains appearance information of the vehicle, and the radiation imaging system 150 obtains a transmission image of the vehicle. Then, feature descriptions on the vehicle may be obtained by combining the appearance information with the transmission image, and then the vehicle's model may be retrieved from a database. Moreover, a vehicle identification unit may be used to identify the corresponding small vehicle, and generate a unique identification ID such as a plate number for the small vehicle in connection with a software system. The unique identification ID is a unique identification, with which the small vehicle can pass the software system. The identification ID may be either data generated by the software system for the small vehicle or a plate number of the vehicle. The present software system identifies a vehicle through its plate number.

As an example, the data processing unit 140 searches the template library to obtain a template image corresponding to the small vehicle to be inspected by combining features obtained from the appearance information with internal structure features obtained from the transmission image. Then, a change region of the obtained ray transmission image relative to the template image is determined. The display device 130 presents the change region to the user.

For example, an image processing unit (a retrieving subsystem) may be used to perform feature extraction on the vehicle's transmission image, retrieve a vehicle model template from a vehicle model template database based on the features extracted by means of the feature extraction, and then determine a change region of the obtained transmission image relative to the vehicle model template.

Figure 2:
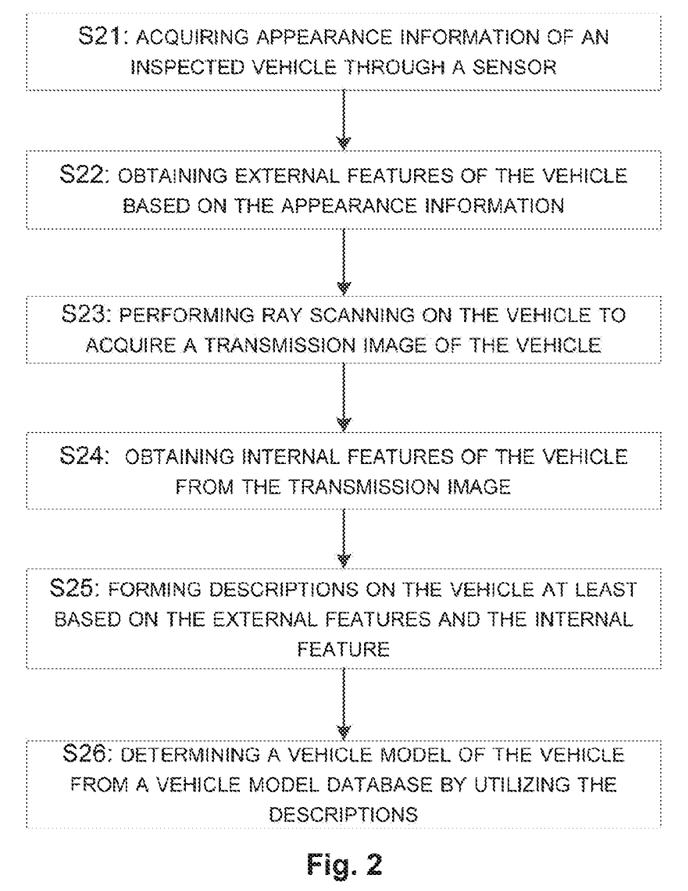
FIG. 2 is a flow chart of a vehicle model identification method according to an embodiment of the present disclosure.

In the following, a flow chart of a vehicle model identification method according to an embodiment of the present disclosure will be further explained by referring to FIG. 2. FIG. 2 illustrates a flow chart of the vehicle model identification method according to an embodiment of the present disclosure. As shown in FIG. 2, at step S21, appearance information of an inspected vehicle is acquired by the sensing device 110, and then external features of the vehicle may be obtained based on the appearance information. For example, the vehicle's size information may be obtained from an infrared curtain, and pictures of the vehicle's face and chassis may be acquired by a CCD camera. Then, external features of the vehicle may be extracted from at least a part of such information.

At step S22, a transmission image of the vehicle is acquired by the radiation imaging system 150, and then internal features of the vehicle may be obtained from the transmission image. For example, a transmission image of the vehicle may be collected through the radiation imaging system 150, and then internal features of the vehicle may be obtained from the transmission image.

At step S23, descriptions on the vehicle are formed at least based on the external features and the internal features. For example, the extracted features may be formed as feature vectors, or weighted summation may be performed on the extracted features to form eigenvalues, as the descriptions on the vehicle.

At step S24, a vehicle model of the vehicle is determined from a vehicle model database by utilizing the descriptions. For example, models of the vehicle have been established based sample data in the vehicle model database, i.e., models of a lot of vehicles have been established by utilizing the corresponding descriptive manners. Then, descriptions on the features of the inspected vehicle are compared with descriptions on vehicle models in the database to determine the best matched vehicle model as that of the inspected vehicle.

Figure 3:
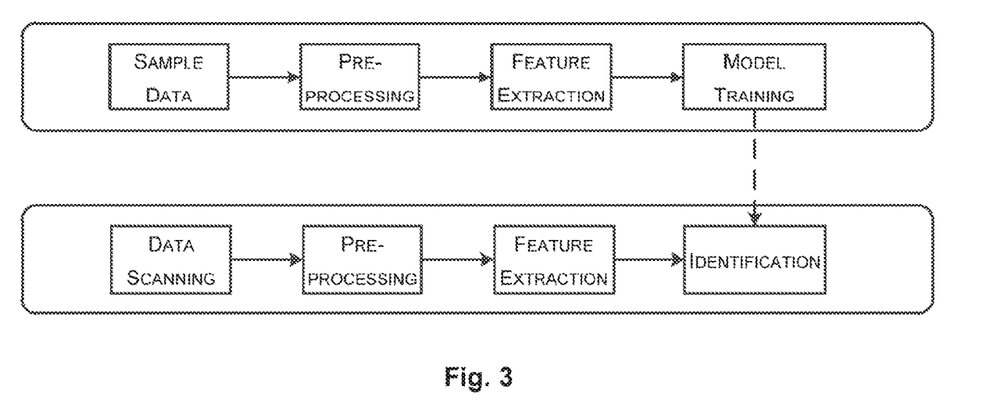
FIG. 3 is a schematic block diagram illustrating a vehicle model identification process according to an embodiment of the present disclosure.

FIG. 3 is a schematic diagram illustrating a vehicle model identification process. As illustrated in FIG. 3, on one hand, models of vehicles are established based on sample data. For example, after performing pre-processing and feature extraction on the sample data, a model of each vehicle model may be established through a training clarifier, and then stored in a database for use in vehicle model identification. On the other hand, in the vehicle model identification process, after performing pre-processing and feature identification on data of an inspected vehicle, vehicle model identification may be performed based on the obtained features. It can be seen that data acquiring, pre-processing, vehicle model feature extraction, training identification modeling and vehicle model database building may be done during the training. During the identification, data acquiring, pre-processing and feature extraction is the same as those during the training, and a vehicle model identification result may be obtained by using the database obtained during the training as well as an identification model.

Figure 4:
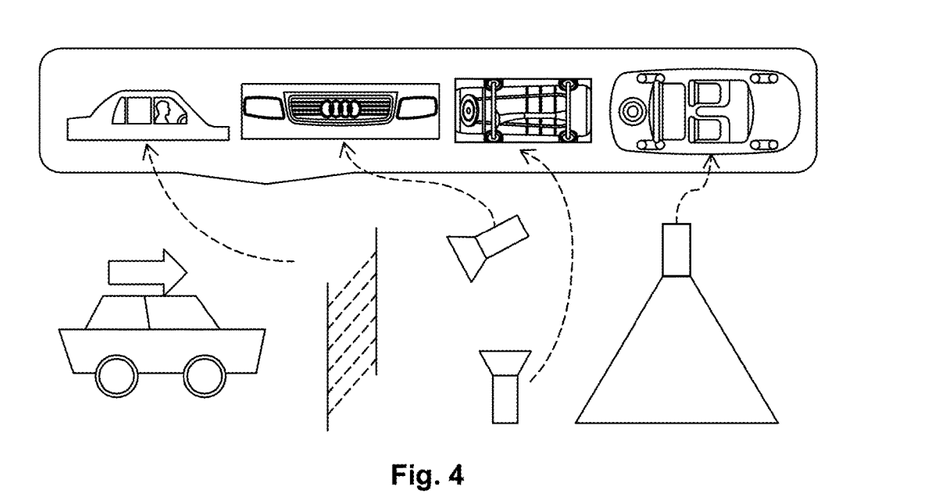
FIG. 4 is a schematic diagram illustrating collecting external data and internal data in a vehicle inspection system according to an embodiment of the present disclosure.

According to an embodiment of the present disclosure, the vehicle model data includes data on an infrared curtain, a visible light image and a transmission image. FIG. 4 is a schematic diagram of data acquiring. Preferably, data on an infrared curtain of a small passenger car, a visible light image of its head, a visible light image of its chassis, and a transmission image of its roof may be obtained in sequence, as illustrated. Information on the vehicle model will be depicted in details in these images.

In general, the entire data acquiring process may be triggered by an infrared curtain. For example, when the curtain detects that there is an object passing, data collecting starts. Then; the vehicle's face, chassis and ray collection will also start.

Data of the infrared curtain is collected in order to obtain the vehicle's side contour and the vehicle's length and height. It may be decided whether the vehicle is a small passenger car based on numerical values of the vehicle's length and height. If yes, the process may proceed with the subsequent steps. If not, no identification operation is performed. It should be appreciated that other means such as a magnetic sensor or a laser sensor and the like may be used to collect the vehicle's size information.

A region between the vehicle's front fog lights is usually located at the intake grille panel area and is called the "vehicle face". The vehicle face has clear appearance characteristics, and may effectively distinguish between manufacturers and may also distinguish between some series and models.

A device for data acquisition is universal, and may be any common equipment of the current brands. Installation of various equipment should satisfy the following conditions: 1) infrared rays are projected in perpendicular to the vehicle's side in such a manner that at least the vehicle's side contour may be acquired (the side contour may at least include the vehicle's chassis); 2) an image of the vehicle's head includes at least a vehicle face, i.e., a vehicle logo and an intake grille parts, and an imaging between an imaging plane and a plate number plane is not greater than 45 degree; 3) in general, a chassis image is acquired by using a linear CCD camera; 4) the main perspective ray beam is perpendicular to the ground in such a manner that a top view transmission image of the vehicle is obtained so as to obtain the more complete internal structure information; and 5) a radar speed sensor is used to acquire the vehicle's speed in real time, for use in image correction.

In addition, the data acquisition may include synchronization of various data. After system start-up, infrared rays are continuously projected. The collection procedure is triggered when rays encounter an obstruction. An absolute time of this moment is set as t0. A face collection device performs one shot at t0, and starts to collect data with t0 as a reference between the chassis and rays. When, the obstruction encountered by the infrared rays disappears, an absolution time of this moment is set as t1. At this moment, the collection process stops and the chassis and perspective collection device stops the collection.

Original data collected at one time may be set as $O_{IR}$ (infrared), $O_{VF}$ (vehicle face), $O_U$ (chassis) and $O_X$ (perspective), respectively. Except for $O_{VF}$, other data is collected in frames. In each frame, a time of the frame relative to t0 as well as a vehicle real-time speed may be acquired.

A vehicle chassis image may be used in vehicle model identification. However, this may have poor effect since the chassis may have obvious stain and is often equipped with a guard. In fact, information provided by the chassis can effectively distinguish between series and models and express a certain internal structure, and thus can be used as a kind of modality to improve identification precision.

According to an embodiment of the present disclosure, respective pre-processing process is performed on respective modality images. The pre-processing has two purposes: one is to normalize images, and the other one is to align the images. For all images, normalization means that a physical dimension represented by each pixel of each modality is unified. Preferably, each pixel of each infrared image is 2 cm*2 cm, each pixel of each vehicle face image represents 6 mm*6 mm, each pixel of each chassis image identifies 1 cm*1 cm, and each pixel of each perspective image identifies 5 mm*5 mm. Alignment refers to that relative displacement of image contents in each modality is as small as possible. For example, for the same vehicle model, image contents should be made as consistent as possible.

In general, infrared data, chassis data and perspective data is all in a linear scanning manner, and is related to a vehicle speed. Thus, it is needed to correct an image by using a real-time vehicle speed, so as to achieve a purpose of dimension normalization. For a vehicle face image, after the location of a camera is fixed and a condition is trigger, the obtained image may basically satisfy the dimension normalization condition. It is to be noted that in order to reduce the impact of dirt in the chassis image, the pre-processing of the chassis image includes image gradient, i.e., merely maintaining edge information in the image without keeping its entire appearance.

For example, $O_{IR}$, $O_U$ and $O_X$ may be scaled according to the corresponding timestamp and a vehicle real-time speed in such a manner that in each modality, each pixel has a unified physical dimension. Since the speed and time at each frame is known, the physical location of the current frame may be known, i.e., a location of the frame in the image can be obtained. After de-noising processing, a gradient operation is applied on the chassis image, to obtain an infrared image IR, a chassis image $I_U$, and a perspective image $I_X$, respectively.

The $O_{VF}$ image is subjected to geometric correction (correction parameters are acquired by the camera through manual correction before the data acquisition procedure) to obtain a parallel light projection image $O'_{VF}$ in a view of a vertical direction. Positioning the vehicle face is not involved in the present disclosure, and the related method may implement positioning through symmetry using a plate number and the like auxiliary information. In this embodiment, $O'_{VF}$ is directly subjected to graying, a gradient map is found, a vertical projection is determined to find a symmetric axis, a moving window of 100*200 is employed to slide up and down with the symmetric axis as a center, and then a sum of absolute values of gradients in the window is found. During the sliding, there will be two maximal values, and the upper one is a desired location. A moving window at such a location is a normalized vehicle face image $I_{VF}$.

Figure 5:
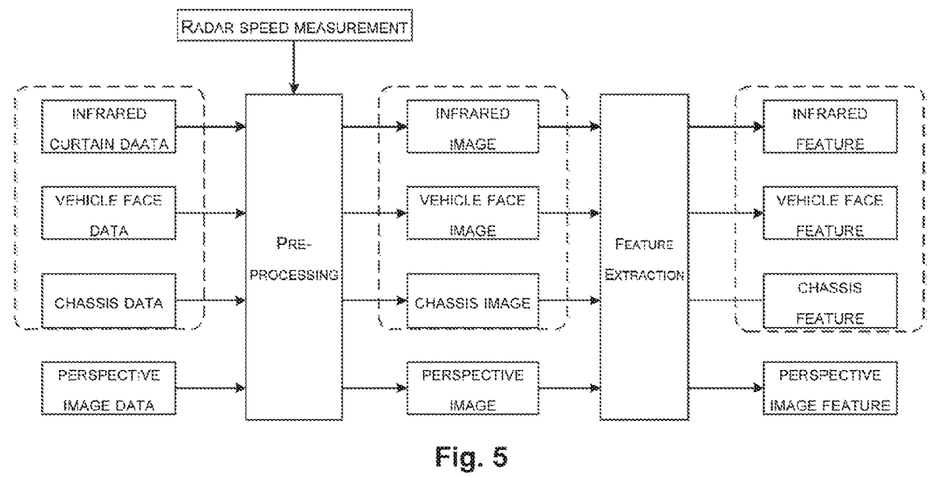
FIG. 5 illustrates a process in which a vehicle inspection system performs vehicle model identification based on the acquired external data and internal data according to an embodiment of the present disclosure.

FIG. 5 shows a relation between processes of pre-processing and feature extraction. After the pre-processing, the individual categories of data contents, though having large differences, are in the field of image and can thus be subjected to feature extraction using one single method. Alternatively, their respective features can be designed based on the characteristics of their modalities. In particular, for the respective modalities, especially vehicle face images, the feature extraction can be performed using various appearance based human face identification algorithms, such as sub-space, multi-scale wavelet transform (e.g., Gabor features), Scale Invariant Feature Transform (SIFT), Bag of visual Word (BOW), and the like. However, in fact, the vehicle model data has its own specific characteristics. It is advantageous in that there are large differences between different vehicle models and there are objective measures (dependent on model drawings), and the collected images contain mainly rigid deformations. Its disadvantages lie in the small number of samples for each category. In practice, only one collection is used as a template for one category.

The features can be extracted based on the characteristics of modalities, respectively. For example, features of an infrared image include the length, width and contour of a vehicle. These parameters can be easily extracted from the image. Major features of a vehicle face include a vehicle logo and an intake grille. These two features can be extracted separately or as a whole. An accurate extraction method should include: first detecting a position of the vehicle logo, extracting its SIFT feature, then removing the image at the position of the vehicle logo, and applying sub-space dimension reduction to the remaining portion for feature extraction. In order to increase the operation speed, preferably, a good effect can be obtained by applying a sub-space analysis to the entire vehicle face. The scheme to be used includes, but not limited to, linear schemes such as Principal Component Analyze (PCA), neural network schemes such as Auto Associative Network (ANN), probabilistic model such as Gaussian Process Latent Variable Model (GPLVM), and the like.

The chassis image has been pre-processed into a gradient image. Features of the gradient image include, but not limited to: 1) using the sub-space scheme in the above vehicle face feature extraction; 2) being described in form of edges after binarization; 3) using local projection features. The scheme 1 has poor effects on the gradient image and the scheme 2 has a low point matching speed and is thus not suitable for real time applications. Hence, it is preferable to perform feature extraction on the chassis image using local projection features. In particular, the image is divided into a number of sub-images, e.g., into 6 non-overlapping sub-images uniformly, and the horizontal and vertical projections of each sub-image can be calculated. The 6*2 projections can be concatenated to form a feature vector.

A perspective image can reflect the internal structure of the vehicle and is necessary for accurate identification. It is to be noted that the perspective image can also reflect some external feature, e.g., contour, of the vehicle. However, the present disclosure focuses on obtaining its internal features. For the perspective image, the extraction schemes for the vehicle face or chassis image can also be used. However, since the perspective image has a large size, in the present disclosure, preferably, its feature extraction is performed using a BOW model with local weights, which is characterized as follows. The perspective image is uniformly divided into a number of local regions each having its own BOW feature. These BOW features are weighted based on local importance, and concatenated or directly summed to form a perspective feature. Here, the local importance is set manually or obtained by means of automatic learning and reflects a degree of importance of the local feature. For example, due to influence of clutters, the trunk of the vehicle has lower local importance than the head perspective. In general, the importance goes as head>side>body>rear.

In case of low requirement on accuracy, or fixed vehicle model, or limited computational capability, the respective modality features can be extracted using one single method, e.g., PCA or BOW, so as to extract all modality features. Further, all the modality images can be concatenated into one image for feature extraction as a whole.

1) Feature Extraction from Infrared Image $I_{IR}$ $I_{IR}$ is a binarized image. First, a connected region analysis is applied to the image to obtain a top air connected region. The bottom value of each column in this region is the contour value of the vehicle in that column. Accordingly, the contour C of the vehicle can be derived, which is a two-dimensional vector having a fixed length. For example, assuming that each pixel in the image is 2 cm and each image has a reserved length of 5 m, C is a 250-dimensional vector. The maximum value of C is the height H and the non-zero span of C is the length W of the vehicle. It is determined based on the height and the length whether the date should be subjected to subsequent calculation. For example, a vehicle that is too high or too long will be considered as a truck, or an object that is too low or too short will be considered as interference, which will not be calculated.

2) Feature Extraction from Vehicle Face Image $I_{VF}$

In this embodiment, $I_{VF}$ feature will be extracted using the PCA method. The effect of this method is to reduce the dimension of the data, improve the operation speed and avoid over-fitting. This algorithm is easy to implement and the description thereof will be omitted here. The extracted feature F is a one-dimensional vector. In this embodiment, a good effect can be achieved with 50 dimensions.

3) Feature Extraction from Chassis Image $I_U$ $I_U$ is uniformly divided into 2*3 blocks. Without loss of generality, the size of $I_U$ is set to 200*600 and each block has a size of 100*200. For each sub-graph, accumulative horizontal and vertical projections are derived, with the numbers of projection dimensions of 100 and 200, respectively. The projections of the 6 sub-graphs are concatenated to obtain an 1800-dimensional vector, to which PCA analysis is applied to form a 100-dimensional chassis feature U.

4) Feature Extraction from Perspective Image $I_X$

As $I_U$, the perspective image $I_X$ is divided into a number of sub-blocks, e.g., 2*3 blocks. A BOW feature is obtained for each block. The BOW is a well-known algorithm and there are various implementations by open source codes such as opencv and vlfeat, and the description thereof will be omitted here. The number of dimensions for the BOW depends on the dictionary obtained by training. In order to achieve a high accuracy, the number of dimensions can be set to 1000. After that, an importance factor can be set manually for the BOW of each block. For example, two blocks for the head can be set to 3.0, two blocks for the middle can be set to 2.0, and two blocks for the rear can be set to 1.0. The final BOW is obtained by summing up products of the BOW features of the respective blocks with respective factors, finally resulting in a perspective feature vector X of 1000 dimensions.

During the training process of the classifier, various classifiers can be used. For example, schemes such as Linear Discriminant Analyze (LDA), Linear Support Vector Machine (LSVM), non-linear Nearest Neighbors (KNN), Support Vector Machine (SVM), Decision Tree (DT) and Boosting can be implemented in some way, In other embodiments, each modality is considered to be independent and can be recognized by means of information fusion, such as feature-level fusion and decision-level fusion policies.

Preferably, in some embodiments, the fusion identification is achieved in a modality cascaded form. That is, the infrared feature, vehicle face feature, chassis feature and perspective feature are identified sequentially and the identification range is narrowed each time to finally achieve an accurate identification. In this way, the first three modalities can share samples in a certain range, so as to improve the identification rate. Similar to feature extraction, the identification classifiers can be constructed individually based on the characteristics of the respective modalities. In our experiment, the KNN and the Exemplar SVM (ESVM) can achieve good effects. Another advantage of them lies in incremental learning and the cost for online training is low during use of the model. Hence, they are preferable schemes.

Further, in order to achieve quick search, schemes such as K-dimensional Tree (Kd Tree), hash coding or the like can be used. During the training process, databases are created for the identification of each vehicle model, the individual modality features and the related classifiers, so as to create a correspondence for use in the identification. In this embodiment, the Nearest Neighbors scheme is used for identification, and the Kd Tree fast searching algorithm is used for training, Kd Trees are created for the modalities, respectively and the models are saved.

During the identification, after the same processes of data acquisition, pre-processing and feature extraction as in the training process, by searching in the databases or classifying by the associated classifiers, the final result of vehicle model identification can be obtained. For example, existing training databases contain a large amount of vehicle model data and the set of databases can be represented as {C, F, U, X} and four different Kd trees corresponding to them. When an unknown category of data is obtained, first its features are extracted to obtain its C, F, U, X features. In this embodiment, parallel operations are adopted for fast identification. Thresholds can be set manually, or can be obtained automatically by learning. Different modalities may have different thresholds. It is assumed here that four vehicle models, N1, N2, N3 and N4, are obtained for four modalities, respectively. An intersection among the vehicle models N1, N2, N3 and N4 as obtained for the four modalities is determined. Here, the vehicle model closest to the X feature is the identification result.

Figure 6:
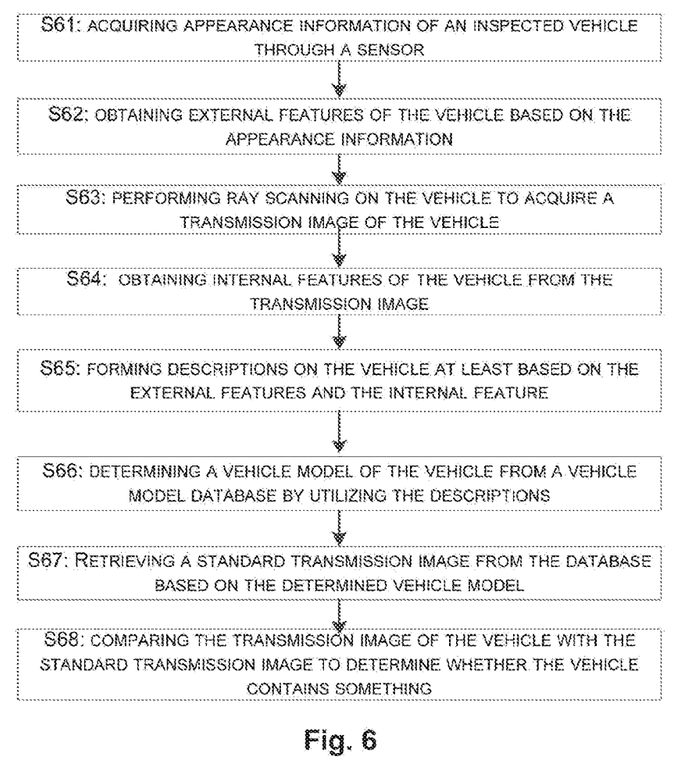
FIG. 6 is a flow chart of a vehicle inspection method according to an embodiment of the present disclosure.

The above vehicle model identification technique can be applied in a vehicle inspection process. FIG. 6 is a flowchart illustrating a vehicle inspection method according to an embodiment of the present disclosure. As shown in FIG. 6, the steps S61, S62, S63, S64, S65 and S66 are the same as the steps S21, S22, S23, S24, S25 and S26 in the above FIG. 2, respectively, and the details thereof will be omitted here. At step S67, based on the determined vehicle model, a standard transmission image of the vehicle model is retrieved from the database. At step S68, it is determined whether the vehicle contains something that is carried secretly by comparing the transmission image of the inspected vehicle with the standard transmission image.

In some embodiments, a changed region of the transmission image of the inspected vehicle relative to the standard transmission image can be determined and presented to the user. Further, the step of determining the changed region of the X-ray image relative to the template image includes: registering the X-ray image and the template image; calculating a difference between the registered X-ray image and template image. The step of presenting the changed region to the user includes highlighting the changed region in the transmission image.

With the method according to the above embodiment, it is possible to perform contactless, non-invasive, accurate vehicle model identification on a vehicle, which is of great significance in fields of intelligent traffic, security inspection and the like.

The above detailed description has already set forth numerous embodiments of the method and device for estimating the weight information of the object to be inspected with reference to the diagrams, flow charts, and/or examples. In the case where the diagrams, flow charts, and/or examples comprise one or more functions and/or operations, one skilled in the art should appreciate that each function and/or operation in the diagrams, flow charts, or examples may be implemented by various structures, hardware, software, firmware or any combination thereof either alone and/or in any combination. In an embodiment, several parts of the subject matter described in the embodiments of the present disclosure may be implemented by Application Specific Integrated Circuit (ASIC), Field Programmable Gate Array (FPGA), Digital Signal Processor (DSP), or any other integrated form. However, one skilled in the art should appreciate that some aspects of the embodiment disclosed herein may be partially or wholly implemented in an integrated circuit effectively, implemented as one or more computer programs running on one or more computers (for example, one or more programs running on one or more computer systems), implemented as one or more programs running on one or more processors (for example, one or more programs running on one or more micro-processors), implemented as firmware, or substantially any combination thereof, and one skilled in the art is capable to design the circuit and/or write software and/or firmware code. Further, one skilled in the art would appreciate that the mechanism of the subject matter of the present disclosure may be distributed in various forms of program products, and the exemplary embodiments of the subject matter of the present disclosure may be applicable irrespective of the specific types of signal carrier media for distribution. Examples of the signal carrier media comprise but not limited to: a recordable medium such as floppy disk, hard drive, compact disk (CD), digital versatile disk (DVD), digital tape, computer memory, etc.; and a transmission medium, such as digital and/or analog communication medium (for example, optical fiber, waveguide, wired communication link, wireless communication link, etc.)

Although the present disclosure is already described with reference to several typical embodiments, it is to be appreciated that the terms used herein are illustrative and exemplary, rather than limiting. Since the present disclosure may be practice in multiple forms without departing from the spirit or essence, it is to be noted that the above embodiments are not limited to any previously described details and shall be interpreted broadly within the spirit and scope defined by the claims. Therefore, all changes and variations fall into the scope of the claims or their effectives shall be embraced by the claims.

We claim:

1. A vehicle identification method comprising:
   acquiring appearance information of an inspected vehicle and obtaining external features of the vehicle based on the appearance information;
   acquiring an X-ray image of the vehicle and obtaining internal features of the vehicle from the X-ray image;
   forming descriptions on the vehicle based on the external features and the internal features; and
   determining a vehicle model of the vehicle from a vehicle model database by utilizing the descriptions,
   wherein the appearance information includes contour information obtained by using an infrared sensor, and face information and chassis information of the vehicle obtained using a visible light sensor, and wherein the external features include contour features based on the contour information, face features based on the face information, and chassis features based on the chassis information,
   wherein the contour features, the face features, the chassis features, and internal features are respectively extracted based on characteristics of modalities thereof, and
   wherein the vehicle is identified by first using the contour features, the face features, the chassis features, and internal features in a sequential form to improve an identification rate of the vehicle model of the vehicle.

2. The method according to claim 1, wherein said obtaining internal features of the vehicle from the X-ray image comprises:
   dividing the X-ray image into a plurality of sub-image blocks;
   performing feature extraction on the plurality of sub-image blocks; and
   performing significance weighting on features of each sub-image block to form the internal features of the vehicle.

3. The method according to claim 2, wherein the vehicle's head has significance larger than that of the vehicle's side.

4. The method according to claim 2, wherein a bag-of-word model based feature extraction is performed on the plurality of sub-image blocks, and local significance weighting is performed on the extracted bag-of-word model features to form perspective features by means of concatenation or direct summation.

5. The method according to claim 1, wherein a gradient operation is applied on the chassis image to form a gradient image, and then local projection features of the gradient image are used as the chassis features.

6. The method according to claim 5, wherein the gradient image is divided into a plurality of sub-image blocks, and a horizontal projection, a vertical projection and/or a slanting projection of the sub-image blocks are calculated, respectively, to form feature vectors as the chassis features.

7. A vehicle identification system comprising:
   a sensor configured to sense appearance information of an inspected vehicle;
   a ray scanning device configured to perform ray scanning on the inspected vehicle to acquire an X-ray image of the vehicle; and
   an information processing device configured to obtain external features of the vehicle based on the appearance information, to obtain internal features of the vehicle from the X-ray image, to form descriptions on the vehicle based on the external features and the internal features, and to determine a vehicle model of the vehicle from a vehicle model database by utilizing the descriptions, wherein the appearance information includes contour information obtained by using an infrared sensor, and face information and chassis information of the vehicle obtained using a visible light sensor, and wherein the external features include contour features based on the contour information, face features based on the face information and chassis features based on the chassis information, wherein the contour features, the face features, the chassis features, and internal features are respectively extracted based on characteristics of modalities thereof, and wherein the vehicle is identified by first using the contour features, the face features, the chassis features, and internal features in a sequential form to improve an identification rate of the vehicle model of the vehicle.

8. The vehicle identification system according to claim 7, wherein the information processing device is further configured to divide the X-ray image into a plurality of sub-image blocks, perform feature extraction on the plurality of sub-image blocks, and perform significance weighting on features of each sub-image block to form the internal features of the vehicle.

9. The vehicle identification system according to claim 8, wherein the vehicle's head has significance larger than that of the vehicle's side.

10. A vehicle identification method comprising:
acquiring appearance information of an inspected vehicle and obtaining external features of the vehicle based on the appearance information;
acquiring an X-ray image of the vehicle and obtaining internal features of the vehicle from the X-ray image;
forming descriptions on the vehicle based on the external features and the internal features;
determining a vehicle model of the vehicle from a vehicle model database by utilizing the descriptions;
determining a standard X-ray image of the model from a database by utilizing the determined model; and
determining whether there is an entrainment in the vehicle by comparing the X-ray image of the inspected vehicle with the standard X-ray image, wherein the appearance information includes contour information obtained by using an infrared sensor, and face information and chassis information of the vehicle obtained using a visible light sensor, and wherein the external features include contour features based on the contour information, face features based on the face information and chassis features based on the chassis information, wherein the contour features, the face features, the chassis features, and internal features are respectively extracted based on characteristics of modalities thereof, and wherein the vehicle is identified by first using the contour features, the face features, the chassis features, and internal features in a sequential form to improve an identification rate of the vehicle model of the vehicle.

11. The method according to claim 10, further comprising:
determining a change region of the X-ray image of the inspected vehicle relative to the standard X-ray image; and
presenting the change region to the user.

12. The method according to claim 11, wherein said determining a change region of the X-ray image of the inspected vehicle relative to the standard X-ray image comprises:
performing a registration on the X-ray image of the inspected vehicle and the standard X-ray image; and
calculating a difference between the X-ray image of the inspected vehicle and the standard X-ray image.

13. The method according to claim 12, wherein said presenting the change region to the user comprises:
highlighting the change region on the X-ray image.

* * * * *